United States Patent [19]
Vitale

[11] Patent Number: 5,981,098
[45] Date of Patent: Nov. 9, 1999

[54] FLUID FLOW PLATE FOR DECREASED DENSITY OF FUEL CELL ASSEMBLY

[75] Inventor: Nicholas G. Vitale, Albany, N.Y.

[73] Assignee: Plug Power, L.L.C., Latham, N.Y.

[21] Appl. No.: 08/919,648

[22] Filed: Aug. 28, 1997

[51] Int. Cl.[6] .............................. H01M 2/00; H01M 2/08; H01M 2/14; H01M 8/00
[52] U.S. Cl. .............................. 429/34; 429/35; 429/36; 429/39
[58] Field of Search ................... 429/12, 13, 26, 429/34, 38, 39, 35, 36

[56] References Cited

U.S. PATENT DOCUMENTS

| | | | |
|---|---|---|---|
| 3,394,032 | 7/1968 | Danner | 136/86 |
| 3,492,161 | 1/1970 | Hooper et al. | 136/86 |
| 4,037,023 | 7/1977 | Grehier et al. | 429/12 |
| 4,276,355 | 6/1981 | Kothmann et al. | 429/26 |
| 4,344,832 | 8/1982 | Dahlberg | 204/258 |
| 4,478,918 | 10/1984 | Ueno et al. | 429/38 |
| 4,678,724 | 7/1987 | McElroy | 429/34 |
| 4,988,583 | 1/1991 | Watkins et al. | 429/30 |
| 5,108,849 | 4/1992 | Watkins et al. | 429/30 |
| 5,230,966 | 7/1993 | Voss et al. | 429/26 |
| 5,232,792 | 8/1993 | Reznikov | 429/14 |
| 5,300,370 | 4/1994 | Washington et al. | 429/34 |
| 5,384,208 | 1/1995 | Brand et al. | 429/34 |
| 5,472,801 | 12/1995 | Mattejat et al. | 429/39 |
| 5,496,655 | 3/1996 | Lessing | 429/34 |
| 5,503,944 | 4/1996 | Meyer et al. | 429/13 |
| 5,514,487 | 5/1996 | Washington et al. | 429/39 |
| 5,521,018 | 5/1996 | Wilkinson et al. | 42/26 |
| 5,527,363 | 6/1996 | Wilkinson et al. | 29/623.1 |
| 5,643,690 | 7/1997 | Tateishi et al. | 429/34 |
| 5,683,828 | 11/1997 | Spear et al. | 429/13 |
| 5,776,624 | 7/1998 | Neutzler | 429/26 |

*Primary Examiner*—Maria Nuzzolillo
*Assistant Examiner*—Jonathan Crepeau
*Attorney, Agent, or Firm*—Heslin & Rothenberg, P.C.

[57] ABSTRACT

A fluid flow plate includes first and second outward faces. Each of the outward faces has a flow channel thereon for carrying respective fluid. At least one of the fluids serves as reactant fluid for a fuel cell of a fuel cell assembly. One or more pockets are formed between the first and second outward faces for decreasing density of the fluid flow plate. A given flow channel can include one or more end sections and an intermediate section. An interposed member can be positioned between the outward faces at an interface between an intermediate section, of one of the outward faces, and an end section, of that outward face. The interposed member can serve to isolate the reactant fluid from the opposing outward face. The intermediate section(s) of flow channel(s) on an outward face are preferably formed as a folded expanse.

20 Claims, 6 Drawing Sheets

FLUID FLOW PLATE FOR DECREASED DENSITY OF FUEL CELL ASSEMBLY

STATEMENT OF GOVERNMENT RIGHTS

The Government of the United States of America has rights in this invention pursuant to Contract No. DE-AC02-94CE50389 awarded by the U.S. Department of Energy.

CROSS REFERENCE TO RELATED APPLICATION

This application contains subject matter which is related to the subject matter of the following application, which is assigned to the same assignee as this application and filed on the same day as this application. The below listed application is hereby incorporated herein by reference in its entirety:

"FLUID FLOW PLATE FOR IMPROVED COOLING OF FUEL CELL ASSEMBLY," by Nicholas G. Vitale, Serial No. 08/920050.

TECHNICAL FIELD

This invention relates, generally, to fuel cell assemblies and, more particularly, to lightening of fluid flow plates.

BACKGROUND ART

Fuel cells electrochemically convert fuels and oxidants to electricity. Furthermore, fuel cells can be categorized according to the type of electrolyte (e.g., solid oxide, molten carbonate, alkaline, phosphoric acid, or solid polymer) used to accommodate ion transfer during operation.

A Proton Exchange Membrane (hereinafter "PEM") fuel cell converts the chemical energy of fuels such as hydrogen and oxidizers such as air/oxygen directly into electrical energy. The PEM is a solid polymer electrolyte that permits the passage of protons ($H^+$ ions) from the "anode" side of a fuel cell to the "cathode" side of the fuel cell while preventing passage therethrough of the hydrogen and air/oxygen gases. Some artisans consider the acronym "PEM" to represent "Polymer Electrolyte Membrane." The direction, from anode to cathode, of flow of protons serves as the basis for labeling an "anode" side and a "cathode" side of every layer in the fuel cell, and in the fuel cell assembly or stack.

An individual PEM-type fuel cell generally has multiple, transversely extending layers assembled in a longitudinal direction. In the fuel cell assembly or stack, all layers that extend to the periphery of the fuel cells have holes therethrough for alignment and formation of fluid manifolds. Further, gaskets seal these holes and cooperate with the longitudinal extents of the layers for completion of the fluid manifolds. As is well-known in the art, some of the fluid manifolds distribute fuel (e.g., hydrogen) and oxidizer (e.g., air/oxygen) to, and remove unused fuel and oxidizer as well as product water from, fluid flow plates which serve as flow field plates of each fuel cell. Also, other fluid manifolds circulate coolant (e.g., water) for cooling.

As is well-known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidizer fed to each fuel cell are typically humidified. Furthermore, a cooling mechanism is commonly employed for removal of heat generated during operation of the fuel cells.

The PEM can be made using, for instance, a polymer such as the material manufactured by E. I. Du Pont De Nemours Company and sold under the trademark NAFION®. Further, an active electrolyte such as sulfonic acid groups is included in this polymer. In addition, the PEM is available as a product manufactured by W.L. Gore & Associates (Elkton, Md.) and sold under the trademark GORES-ELECT®. Moreover, a catalyst such as platinum which facilitates chemical reactions is applied to each side of the PEM. This unit is commonly referred to as a membrane electrode assembly (hereinafter "MEA"). The MEA is available as a product manufactured by W.L. Gore & Associates and sold under the trade designation PRIMEA 5510-HS.

In a typical PEM-type fuel cell, the MEA is sandwiched between "anode" and "cathode" gas diffusion layers (hereinafter "GDLs") that can be formed from a resilient and conductive material such as carbon fabric. The anode and cathode GDLs serve as electrochemical conductors between catalyzed sites of the PEM and the fuel (e.g., hydrogen) and oxidizer (e.g., air/oxygen) which each flow in respective "anode" and "cathode" flow channels of respective flow field plates.

A given fluid flow plate can be formed from a conductive material such as graphite. Flow channels are typically formed on one or more faces of the fluid flow plate by machining. As is known in the art, a particular fluid flow plate may be a bipolar, monopolar, anode cooler, cathode cooler, or cooling plate.

In order to fabricate a fluid flow field plate, one known configuration utilizes two outer layers of compressible, electrically conductive material and a center metal sheet interposed therebetween. Such a design is disclosed in U.S. Pat. No. 5,527,363 to Wilkinson et al. (entitled "Method of Fabricating an Embossed Fluid Flow Field Plate," issued Jun. 18, 1996, and assigned to Ballard Power Systems Incorporated and Daimler-Benz AG) and divisional U.S. Pat. No. 5,521,018 to Wilkinson et al. (entitled "Embossed Fluid Flow Field Plate for Electrochemical Fuel Cells," issued May 28, 1996, and assigned to Ballard Power Systems Incorporated and Daimler-Benz AG). In particular, the outward face of each of the two outer layers is embossed with flow field channels. These embossed outward faces serve as the two major faces for the fluid flow field plate.

However, existing fluid flow plate constructions require disadvantageously large usage of material for their formation. Moreover, such fluid flow plates add undesirable weight to the fuel cell assembly. Thus, a need exists for decreasing material usage in fuel cell assemblies.

SUMMARY OF THE INVENTION

Pursuant to the present invention, the shortcomings of the prior art are overcome and additional advantages provided through the provision of a fuel cell assembly in which a number of interior pockets in a given fluid flow plate decrease material usage and decrease weight of the fuel cell assembly.

According to the present invention, a fluid flow plate includes a first member having a flow field face and a first inward face. The flow field face has a flow channel thereon for carrying reactant fluid for a fuel cell of a fuel cell assembly. The first member is adapted for coupling with a second member in order to form the fluid flow plate. The second member has a second inward face. One or more pockets are formed between the first and second inward faces for decreasing density of the fluid flow plate.

The flow channel can include one or more end sections and an intermediate section. Also, the fluid flow plate can include the second member. Furthermore, the fluid flow plate can have an interposed member positioned between the second inward face and an interface between the intermediate section and the end section(s). The interposed member can serve to isolate the reactant fluid from the second member. Additionally, the one or more end sections can include an inlet, a turn, and an outlet.

In another aspect of the invention, the fluid flow plate comprises a third member positioned adjacent the first inward face. Moreover, the intermediate section can be fastened to the third member and/or the end section(s). Also, the end section(s) can be fastened to the third member and/or the intermediate section.

An interposed member can be positioned between the first and second inward faces in order to isolate the reactant fluid from the second member.

The first inward face can include an indentation thereon for forming a portion of the pocket(s). The flow field face can include a protuberance thereon for forming a portion of the flow channel. Further, the indentation can form the protuberance. The first inward face can include a first land adjacent the indentation. Moreover, the second inward face can include a second indentation thereon for forming a portion of the pocket(s). Also, the inward face can include a second land adjacent the second indentation. The first and second lands can be coupled. Additionally, conductive material can be interposed between the first and second lands.

In another embodiment of the present invention, a fluid flow plate has a member as well as first and second outward faces. The member has an inward face with an indentation thereon for forming a pocket between the outward faces. The member can include the first outward face with a protuberance thereon for forming a portion of a flow channel for carrying fluid for a fuel cell assembly. The indentation forms the protuberance. Also, the pocket decreases density of the fluid flow plate.

The fluid can be reactant fluid for a fuel cell of the fuel cell assembly. The member can be adapted for coupling with a second member having an inward face. Moreover, the pocket can be formed between the inward faces of the first and second members.

In yet another aspect of the present invention, a fluid flow plate includes first and second outward faces. Each of the faces has a flow channel thereon for carrying a respective fluid. At least one of the fluids serves as reactant fluid for a fuel cell of a fuel cell assembly. A pocket is formed between the first and second outward faces for decreasing density of the fluid flow plate.

At least one of the first and second outward faces can be disposed substantially in a transverse direction. A portion of the pocket can extend between the first and second outward faces substantially in the transverse direction. Further, a portion of the pocket can extend substantially in parallel with a portion of at least one of the first and second outward faces. The fuel cell can be a PEM-type fuel cell.

In a further aspect of the invention, the fluid flow plate comprises a member having an inward face with an indentation thereon for forming a portion of the pocket. The member can include the second outward face with a protuberance thereon for forming a portion of the flow channel of the second outward face. Moreover, the indentation can form the protuberance.

In a still further embodiment of the present invention, the fluid flow plate comprises a first member having the first outward face and a first inward face. Also, the first member is adapted for coupling with a second member in order to form the fluid flow plate. Additionally, the second member has a second inward face. The pocket is formed between the first and second inward faces. The fluid flow plate can include the second member having the second outward face.

The invention further contemplates a method of forming a fluid flow plate. An indentation is formed on an inward face of a member in order to form a pocket between first and second outward faces of the fluid flow plate. The pocket decreases density of the fluid flow plate. A protuberance is formed on the first outward face of the fluid flow plate in order to form a portion of a flow channel for carrying fluid for a fuel cell assembly. Moreover, the forming of the indentation contributes to the forming of the protuberance.

Thus, the present invention advantageously provides decreased material usage in formation of fluid flow plate(s).

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a fuel cell assembly is provided in which a number of interior pockets are formed in the fluid flow plate(s) in order to decrease material usage by, and decrease weight of, the fuel cell assembly.

Figure 1:
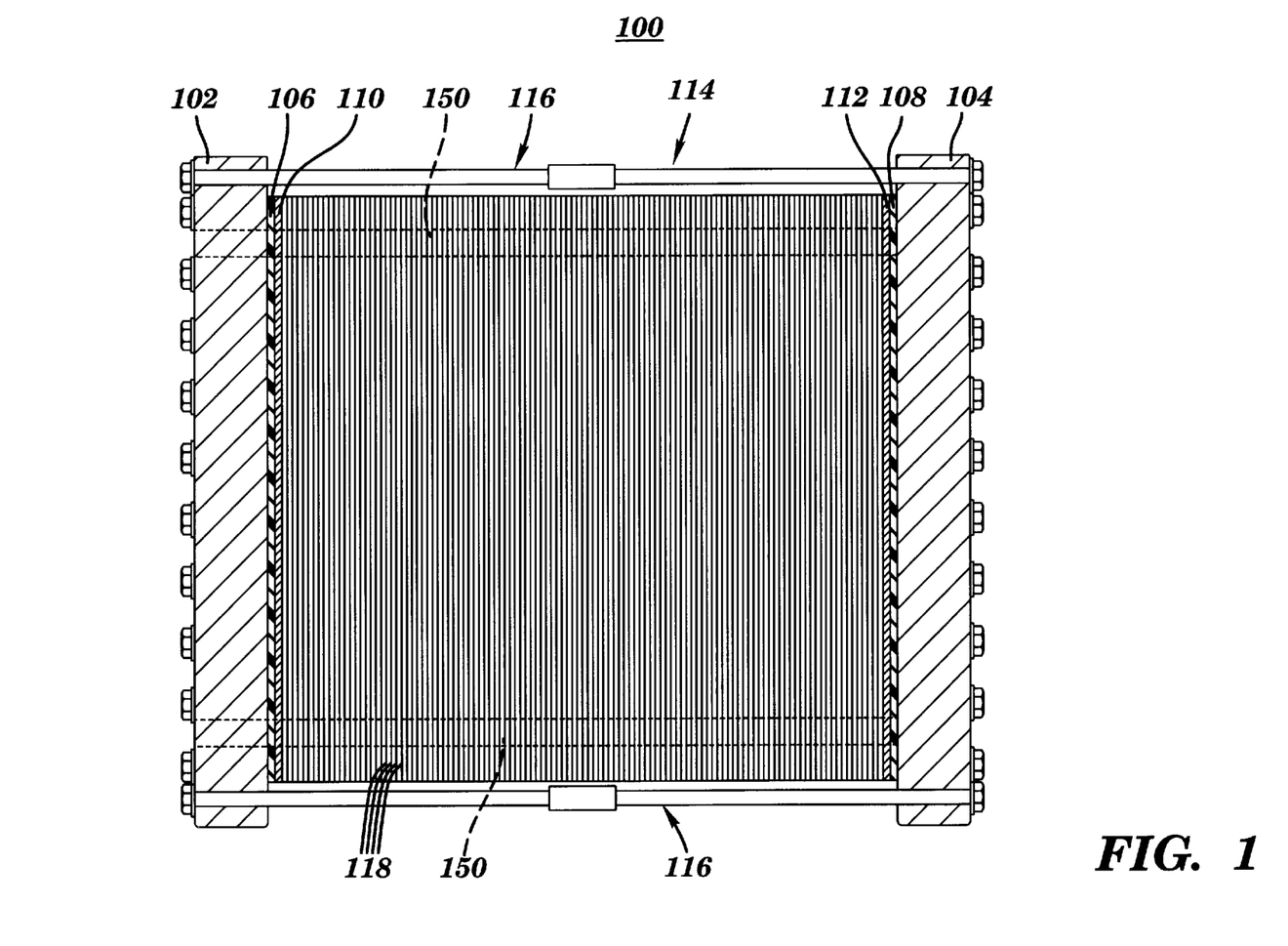
FIG. 1 is a sectional, elevation, side view of one example of a fuel cell assembly incorporating and using the fluid flow plate(s) of the present invention.

One example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector plates 110 and 112, with a working section 114 therebetween. Further, the working section includes one or more active sections and can include a selected number of cooling sections, as will be understood by those skilled in the art. Also, a number of structural members 116 join the end plates, as is well-known in the art.

Figure 2:
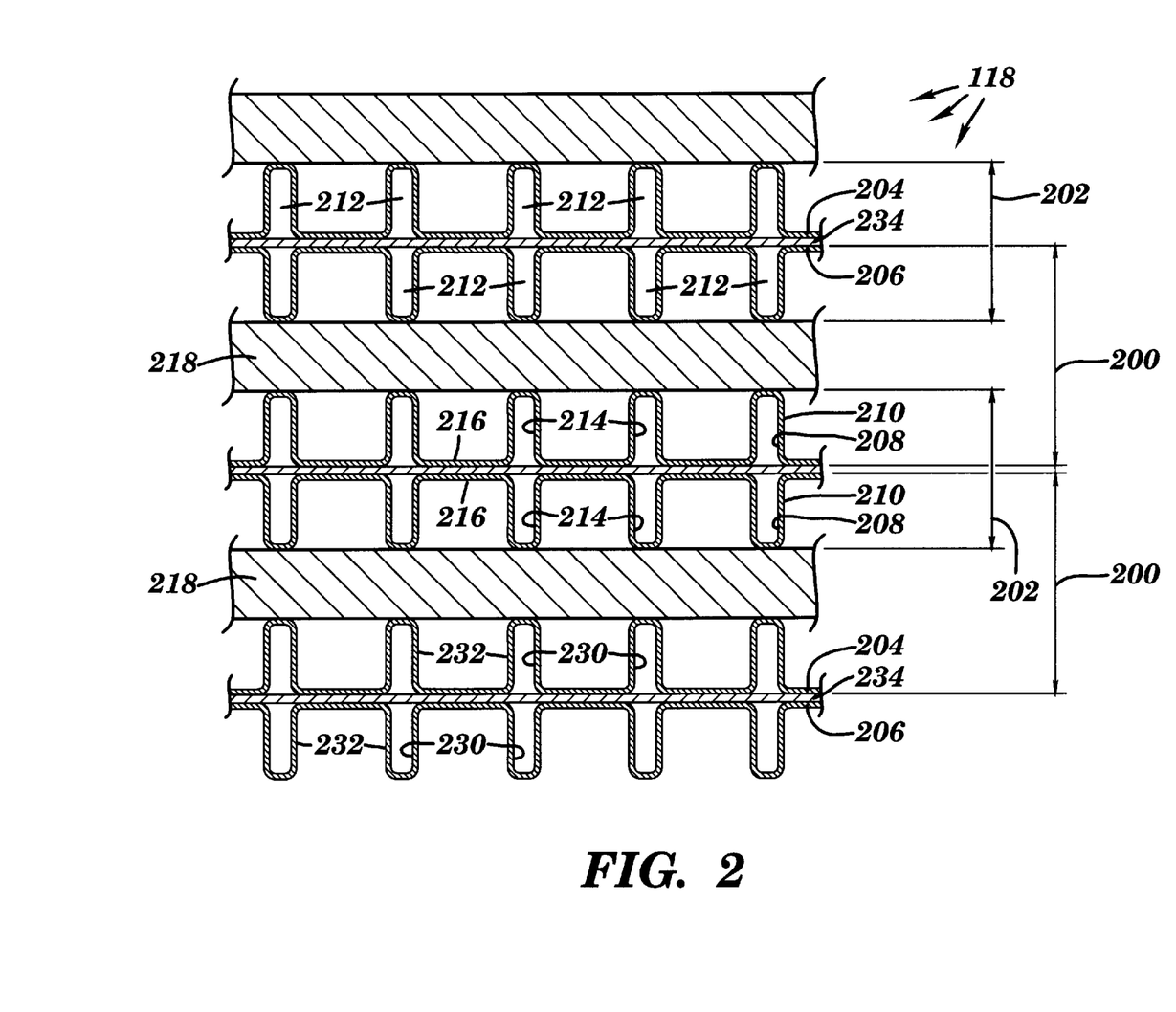
FIG. 2 is an enlarged, cutaway, sectional, partial, side view of multiple fluid flow plates in stacked fuel cell(s) in the assembly of FIG. 1.

Working section 114 includes a number of layers 118. The layers generally form fluid manifolds 150 for supplying fluids to, removing fluids from, and otherwise communicating fluids as desired within the working section, as will be understood by those skilled in the art. Preferably, a plurality of the layers form one or more (e.g., one hundred and eight) PEM-type fuel cells 200 (FIG. 2). The construction and utilization of such fuel cells is known in the art.

By connecting an external load (not shown) between electrical contacts (not shown) of current collector plates 110 and 112, one can complete a circuit for use of current generated by the one or more PEM-type fuel cells 200.

One example of a plurality of layers 118 of working section 114 is depicted in FIG. 2 as forming multiple fuel cells 200. In particular, a given fuel cell includes a pair of fluid flow plates which serve as flow field plates 202. A given flow field plate includes first and second members 204 and 206, each of which has an inward face 208 as well as a fluid flow face that serves as a flow field face 210. Additionally, the flow field plate can have a third, a mid-plane, or an interposed member 234 with inward faces 208 positioned between the first and second members. In particular, the interposed member can serve to prevent fluid communication between the respective inward faces of the first and second members, as discussed in detail below. According to the present invention, coupling or connecting of the inward faces of the members of the fluid flow plate forms a number of caves or pockets 212 that advantageously decrease density of the fluid flow plate.

By decreasing density of fluid flow plate 202 through inclusion of pockets 212 therein, one can desirably increase performance of, for instance, automobiles which employ fuel cell assembly 100. That is, lightening of the fuel cell assembly translates into less energy expended in transporting the fuel cell assembly in order to gain operational benefits of fuel cells 200. Those skilled in the art will appreciate the efficiencies possible from use of the present invention in a wide range of vehicular and other desired applications.

Advantageously, the subject invention eliminates the cost and weight of material (e.g., stainless steel) that would otherwise occupy the inventive pocket(s) 212 within fluid flow plate 202.

The formation of pockets 212 in a given fluid flow plate 202 preferably employs a number of furrows, corrugations, or grooves 214 formed on an inward face 208 of one or more of members 204, 206. Also, flow field face 210 has a number of reactant flow channels 216 thereon for carrying reactant fluid for its corresponding fuel cell 200.

Typically, fuel cell 200 has central elements 218 positioned or extended between a pair of flow field faces 210 of respective fluid flow plates 202, as will be understood by those skilled in the art. The central elements typically include such components as a membrane electrode assembly ("MEA") positioned between gas diffusion layers (hereinafter ("GDLs").

Figure 3:
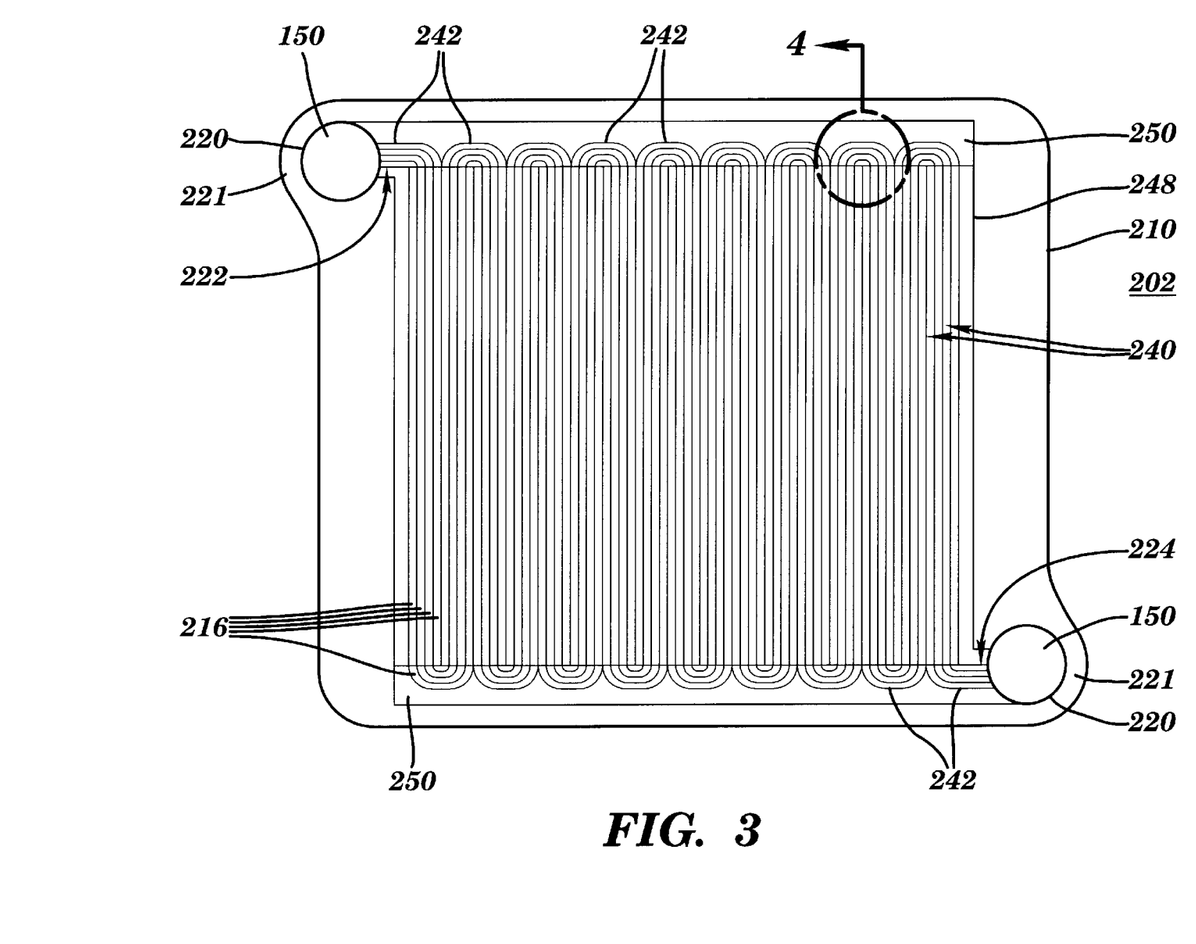
FIG. 3 is a sectional plan view of an outward face of one example of a fluid flow plate in a fuel cell of the assembly of FIG. 1.
Figure 4:
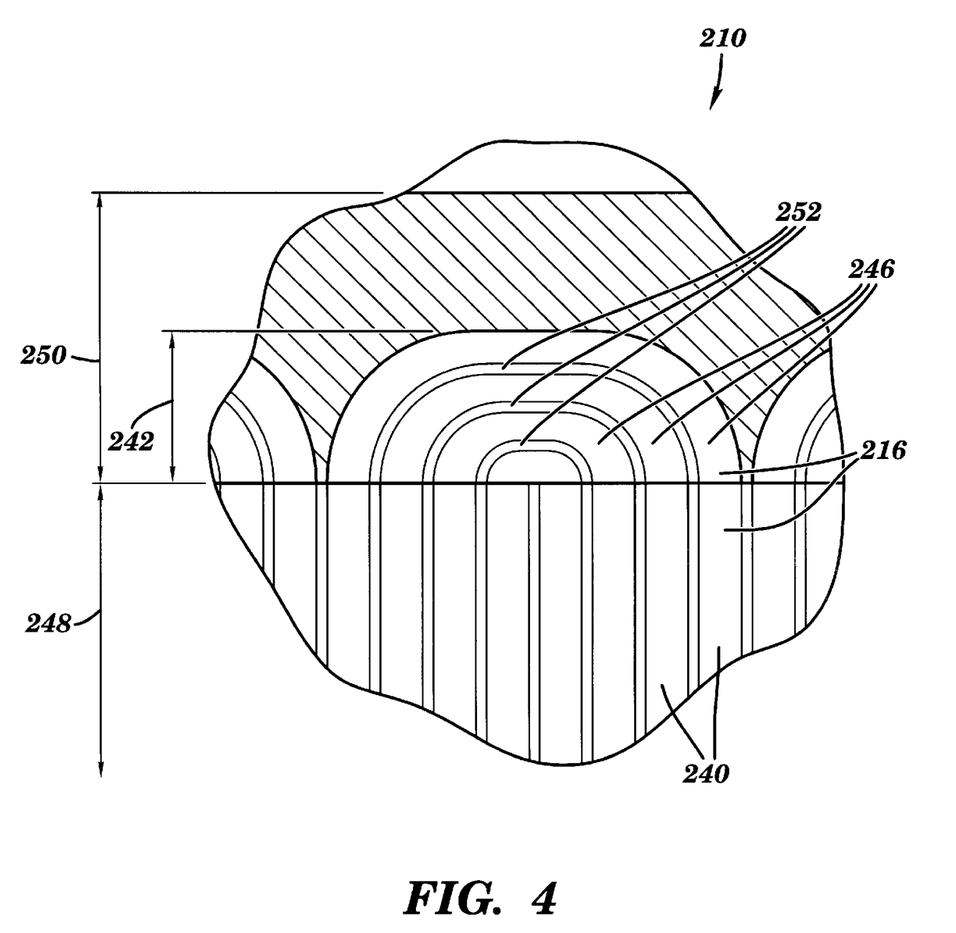
FIG. 4 is a magnified, cutaway, sectional, partial, plan view directed at the region of the fluid flow plate of FIG. 3 indicated by reference numeral 4.

As illustrated in FIGS. 3–4, reactant flow channels 216 can be formed parallel and serpentine on flow field face 210 with inlet(s) 222 and outlet(s) 224 in fluid communication with respective (reactant) fluid manifolds 150. Each flow channel can include substantially straight intermediate sections 240 as well as end sections 242. An expanse 248 can include an entire set of intermediate sections 240 on a given flow field face 210.

End sections 242 can include inlet(s) 222, outlet(s) 224, and turns 246 (FIG. 4). A number of interconnectors or strips 250 can include selected portions of the end sections. Preferably, each of a pair of strips 250 includes an entire line or row of end sections 242, as illustrated.

Expanse 248 as well as pair of strips 250 can each be formed as separate, unitary pieces. Alternatively, one could form the expanse and/or the strip(s) using a desired number of components. For instance, a given strip 250 can be formed from stamped metal or molded plastic. The formation of expanse 248 is discussed further below.

Any of inlet(s) 222 and/or outlet(s) 224 can employ a pressed or raised area/recess/dish in order to enhance fluid communication between fluid manifold(s) 150 and any corresponding reactant flow channel(s) 216. Additionally, an insertable cover or bridgepiece could promote fluid communication between the fluid manifolds and the inlet(s) and/or outlet(s) of the respective flow channel(s). Optionally, one could add tubing to assist fluid communication.

Interposed member 234 (FIG. 2) serves as a reactant fluid isolator between first and second members 204 and 206. That is, in the event of imperfect or otherwise inadequate sealing between given turns 246 (FIG. 4) and their corresponding intermediate sections 240 of reactant flow channels 216 on flow field faces 210 of the members 204 and 206, the interposed member will desirably seal each reactant fluid from the opposite flow field face of flow field plate 202. Namely, the interposed member separates anode reactant fluid (e.g., humidified hydrogen gas for a given fuel cell 200) from cathode reactant fluid (e.g., humidified air for an adjacent fuel cell 200).

Of course, if one were to ensure (e.g., hermetic) sealing of reactant flow channels 216 from inward faces 208 in a given fluid flow plate 202, then one could form the fluid flow plate without interposing member 234. For example, one could choose to securely weld or braze corresponding turns 246 and intermediate sections 240 of the reactant flow channels on flow field faces 210 of first and second members 204 and 206. Alternatively, one could form the flow channels in a unitary fashion.

In order to provide continuous fluid communication in flow channels 216, expanse 248 and strips 250 are adjoined, connected, fastened, attached, or secured. A given flow channel provides continuous fluid flow among its various intermediate section(s) 240 and its inlet 222, turn(s) 246, and outlet 224. The expanse and the strips are cooperatively positioned or registered, for instance, by applying adhesive between interposed member 234 and each of the strips. Further, one could apply adhesive between the expanse and the strips and/or the interposed member. Moreover, any number of parts of fluid flow plate 202 can be formed integrally, such as by welding or brazing.

As depicted in FIG. 3, fluid flow plate 202 can have a number of peripheral holes 220 therethrough which cooperate in formation of fluid manifolds of fuel cell assembly 100. In one preferred embodiment, portions of the peripheral holes are defined by arcs or rims 221 that are fixed, attached, or connected to the fluid flow plate. These rims can have any desired number of components and can be formed, for example, by injection molding of plastic or from elastomer.

Exemplary constructions of fluid flow or flow field plate 202 will now be described. In forming the flow field plate, one may need to consider the acceptability of stretching the base material of members 204 and 206. For instance, pressing can entail greater amounts of stretching than folding. In order to form expanse 248, one could accordingly employ a technique which involves limited amounts of stretching of foil or sheet material. For example, foil can be run through two rollers having thereon shapes to bend grooves 214 of selected pitch and depth. Namely, the rollers would have thereon the reverse image of the desired impression, design, or configuration to be formed on the foil or sheet. Further, one could incrementally crimp the foil or sheet in order to form the grooves.

Expanse 248 can be embodied as folded or corrugated stock/fin/foil/sheet material. For example, one could use folded stainless steel foil. In particular, the expanse of each of members 204 and 206 can take the form of a product manufactured by Robinson Fin Machines, Incorporated (Kenton, Ohio) and sold under a trade designation such as plain fin, flat crest stainless steel having characteristics such as 0.065 in. fin height, 32 fins (16 lands) per in., and 0.008 in. thickness. Further, an exemplary flow channel 216 might have cross-sectional dimensions of 0.066 in. width and 0.065 in. depth.

In another embodiment, members 204 and 206 can each be formed by stamping patterns into thin stainless steel sheet stock. Prior to stamping, the first and second stainless steel sheets might each have exemplary dimensions of 8.32 in. height, 9.55 in. width, and 0.004 in. thickness. The two sheets can be formed, for instance, using a known hydroforming process in which each sheet is placed between an open die and a piece of rubber that seals a high-pressure oil chamber. Next, hydraulic pressure on the oil causes the rubber to impress or stretch the sheet as desired. This contrasts with closed die processes in which the user must match top and bottom dies. Alternatively, one could electroplate the foil or sheet material onto a mold.

The construction of flow channels 216 on, and pockets 212 in, a given fluid flow plate 202 can position on a first face (that becomes inward face 208 of a member 204, 206) valleys or indentations 230 (FIG. 2) which form on the longitudinally opposite face (that becomes flow field face 210 of the member) lands, ridges, crests, or protuberances 232 (FIG. 2).

The anode flow channels (e.g., flow channels 216) and cathode flow channels (e.g., flow channels 216) can have different widths and depths, but are preferably identical in number in order to provide for registration of the channel bottoms of first and second members 204 and 206. Preferably, the first and second members are formed having similar geometries. That is, one can preselect the patterns for the first and second members such that the lands on their respective inward faces 208 will be aligned.

Furthermore, fluid flow plate 202 can tolerate a degree of nonuniformity in grooves 214, such as irregularity in the sidewalls of the grooves. In particular, pockets 212 serve to decrease density of the flow field plate. So, the shape of any individual pocket 212 is of little concern as long as its member 204, 206 satisfies performance requirements. Namely, one may be primarily concerned with fluid flow communication characteristics, such as the height, depth, and/or pitch of flow channel(s) 216.

Generally, one can consider a plurality of valleys separated by ridges to be a plurality of ridges separated by valleys, and vice versa. For instance, following formation of the plurality of indentations 230, one can consider the first face (inward face 208) to be instead a plurality of protuberances, although from such a perspective the member 204, 206 will appear to have a longitudinal offset at its periphery. Likewise, one can also consider the plurality of protuberances 232 to be a plurality of indentations upon a member 204, 206 with a longitudinal offset.

In order to form first and second members 204 and 206 into fluid flow plate 202 with pockets 212 therein, one can pinch together sheets or foils for resistance, spot, or laser welding. Furthermore, one could weld the two foils or sheets with interposed member 234 therebetween. Additionally, flow field faces 210 can face toward, for instance, respective GDLs of corresponding central elements 218.

Therefore, one can advantageously have a first fluid on the outward face (flow field face 210) of the first sheet (e.g., member 204), a second fluid on the outward face (flow field face 210) of the second sheet (e.g., member 206), and pockets 212, for example, between or among inward faces 208 of members 204, 206, and/or 234. In a typical fuel cell assembly or stack 100, the first and second fluids would be reactants (e.g., a fuel such as hydrogen and an oxidizer such as air/oxygen). Desirably, each reactant fluid on one of the outward faces of flow field plate 202 is isolated or sealed from the other reactant fluid on the opposite outward face of the flow field plate.

As appropriate for PEM-type fuel cell operation, fuel cell assembly 100 provides electrical conduction longitudinally through fluid flow plate 202. That is, the bringing together of members 204, 206, and 234 electrically and thermally couples the lands of inward faces 208 on first and second members 204 and 206. Optionally, one can electroplate one or more of these lands with, for instance, silver or copper in order to improve conductivity of the resulting fluid flow plate. Furthermore, these inner lands of the two sheets can be brazed or welded (e.g., either together or else to member 234) in order to integrally define pockets 212.

Interposed member 234 can take the form of, for instance, a conformable and electrically as well as thermally conductive material. The interposed member can serve to reduce electrical and thermal contact resistance between the inner lands. One can interpose the conductive material to any desired degree, for instance, by positioning the conductive material between only some inner lands or transversely extending the conductive material to particular flanges or beyond. Moreover, one could position the interposed member just at or near interfaces or junctions between strips 250 and expanse 248.

For example, interposed member 234 can be formed by etching stainless steel. Moreover, one can unite the two folded foils and the interposed member, such as through metallurgical bonding (e.g., welding or brazing). Optionally, one could position a relatively thin layer or flash of appropriate material (e.g., perhaps silver) onto a portion of the transverse exterior of the interposed member in order to enhance conformability and conductivity. However, the selection of a particular material to be introduced into fuel cell assembly 100 necessitates consideration of whether measures need be taken in order to prevent poisoning or harming a given fuel cell 200.

Preferably, the perimeter of layers 118, which include members 204 and 206, are formed with minimal amounts of material transversely beyond the active extent of working section 114 and fluid manifolds 150 of fuel cell assembly 100, as represented in FIG. 3.

Figure 5:
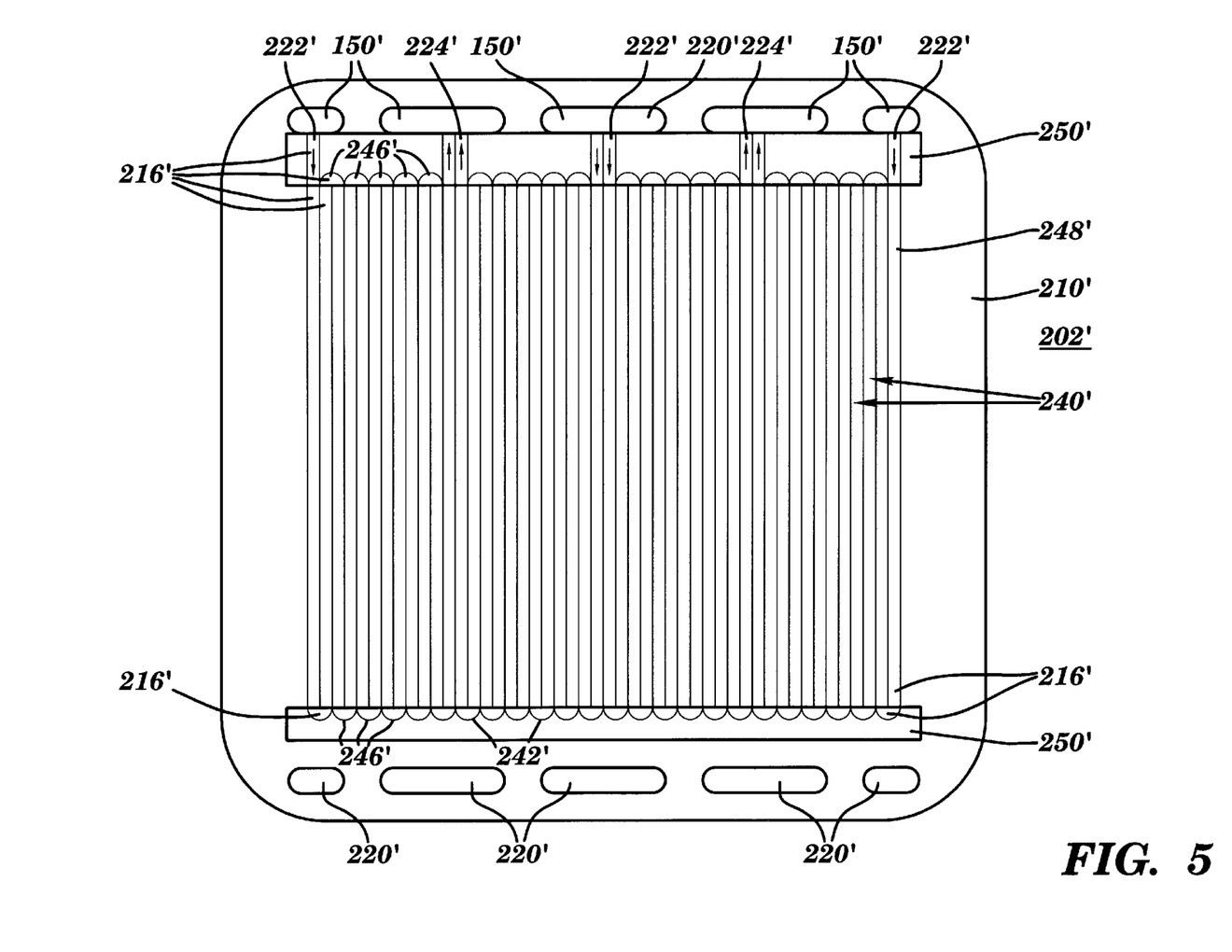
FIG. 5 is a sectional plan view of an outward face of another example of a fluid flow plate in a fuel cell of the assembly of FIG. 1.
Figure 6:
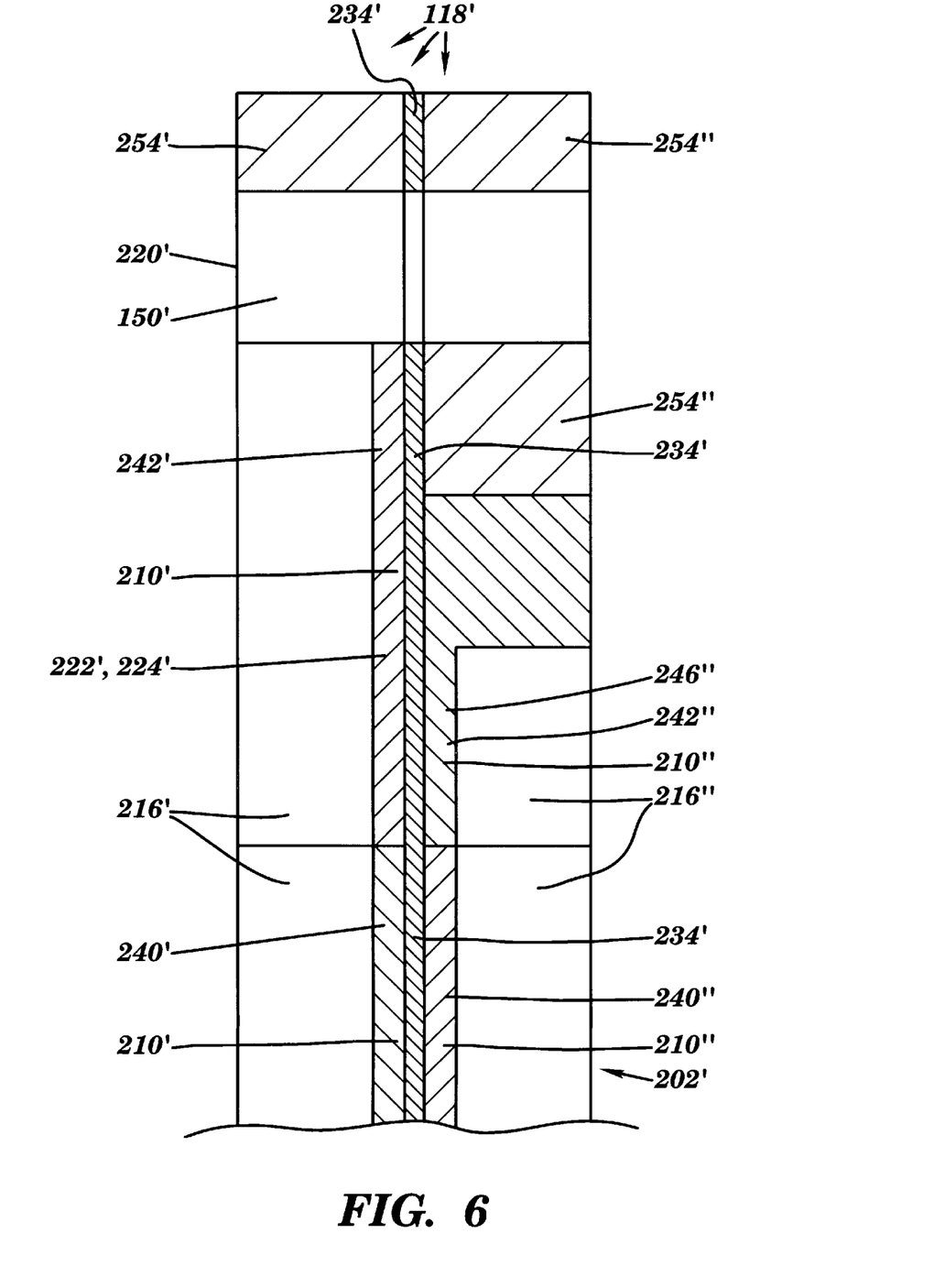
FIG. 6 is an enlarged, cutaway, sectional, partial, side view of a flow channel inlet/outlet area and an opposite flow channel turn area on the fluid flow plate of FIG. 5.

Another embodiment of a fluid flow plate is depicted in FIGS. 5–6 as flow field plate 202'. In particular, strips 250' have only one flow channel 216' connected to expanse 248' at each end section 242'. Namely, turn 246' only provides fluid communication from a single intermediate entry section 240' to a single intermediate leaving section 240'. Thus, one may form a given end section 242', or any desired portion of strip 250', with potentially fewer restrictions from stretchability and/or extension limitations of the constituent material (e.g, stainless steel foil). In particular, formation of only a single turn 246' in each end section 242' might advantageously decrease complexity of fabrication by presenting fewer spacing restrictions.

In contrast, a given end section 242 (FIGS. 3–4) of flow field plate 202 requires sidewalls 252 (FIG. 4) between turns 246 for ensuring individual integrity or separation of multiple flow channels 216. As depicted for illustrative purposes, flow field plate 202 includes four substantially parallel, serpentine flow channels 216. These four channels 216 run side by side through intermediate sections 240 as well as through turns 246. In any given inlet 222 and/or outlet 224, one can opt to include or omit the sidewalls.

Desirably, sidewalls 252 prevent communication or mixing between fluids carried in adjacent flow channels 216. In particular, it is desirable to ensure the integrity of each reactant flow channel 216 in order to maintain adequate pressure drop along the flow channel. Namely, one wishes to prevent liquid (e.g., humidification and/or product water) from resting, aggregating, or otherwise obstructing or plugging the flow channel. By maintaining pressure drop in the flow channel sufficient to overcome surface tension of the liquid (e.g., water), one can avoid disadvantageous electrochemical starvation of fuel cell 200 downstream of the plugging, whether in the form of non-replenishment of reactant fluid and/or drying out of the PEN.

Conversely, in the exemplary illustration of flow field plate 202' in FIG. 5, a given flow field face 210' includes four separate flow channels 216'. Each of flow channels 216' winds largely in isolation over approximately one-quarter of the surface area of expanse 248' as well as its corresponding inlet 222', turns 246', and outlet 224' of strip 250'. Namely, first and second flow channels 216' each begin at respective inlets 222' in fluid communication with upper left-hand and upper right-hand (inlet) fluid manifolds 150', respectively. Further, these first and second flow channels each terminate at corresponding outlets 224' in fluid communication with (discharge) fluid manifolds 150'. The third and fourth flow channels 216' have adjacent or shared inlet(s) 222' in fluid communication with upper center (inlet) fluid manifold 150'. Next, the third and fourth flow channels proceed transversely oppositely to each other on flow field face 210', toward one or the other of the previously mentioned outlets 224', adjacent to or shared with one or the other of the first and second flow channels, as will be understood by those skilled in the art. Naturally, alternative embodiment(s) could interchange positions of the inlets and outlets and/or adopt or implement any modification or other desired configuration.

As appropriate for PEM-type fuel cell operation, the above-described three inlet fluid manifolds 150' and two discharge fluid manifolds 150' preferably service the same reactant fluid (e.g., either humidified hydrogen or else humidified air) for the corresponding flow field face 210'. Furthermore, the opposite flow field face (not shown in FIG. 5) of flow field plate 202' preferably services, through the illustrated lower peripheral holes 220', a companion reactant fluid for an adjacent fuel cell 200 (FIG. 2), as will be understood by those skilled in the art.

Furthermore, strips 250' can include any number of inlets 222', outlets 224', and/or turns 246', in any desired configuration. For example, any strip 250' could form any inlets, outlets, and/or turns either as open-faced channels or else as closed tunnels. Moreover, a given strip and/or a portion of interposed member 234' (FIG. 6) could form any portion of a particular inlet, outlet, and/or turn.

As depicted in FIG. 6, gasket portions 254' and 254" seal peripheral holes 220' and cooperate with the longitudinal extents of layers 118' in formation of fluid manifolds 150'. A given gasket portion 254', 254" can extend further longitudinally than illustrated in FIG. 6 in order to provide a peripheral longitudinal extent surrounding a given GDL of central element 218 positioned adjacent to a given flow field face 210', 210", as will be appreciated by those skilled in the art. Also, the gaskets can be cut or cast. Additionally, gasket portions 254' and 254" can be formed integrally, such as in a fluid flow plate without the interposed member.

Further, a particular gasket can take the form of, for instance, a frame gasket made from a material manufactured by E.I. Du Pont De Nemours Company and sold under the trademark TEFLON®. Alternatively, multiple O-ring gaskets could be used.

Numerous alternative embodiments of the present invention exist. For instance, members 204 and 206 (and optional member 234) could each be formed from any desired material, in any appropriate form. Fluid flow plate 202 could serve any desired function in any position of fuel cell assembly 100. Further, fluid flow plate 202 could easily have any number of flow channels 216 and grooves 214. Also, fluid flow plate 202 could easily have any number of pockets 212 formed therein. For example, any number of pockets 212 could easily be formed from appropriate material interposed between members 204 and 206. Moreover, any of inlet(s) 222 and/or outlet(s) 224 can have any form for fluid communication between the appropriate flow channel(s) 216 and fluid manifold(s) 150. Any formation can accomplish fluid communication among intermediate section(s) 240 and turn(s) 246. Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fluid flow plate for a fuel cell assembly, said fluid flow plate comprising:

a first member having an outward flow field face and a first inward face, said flow field face having a flow channel thereon for carrying reactant fluid for a fuel cell of said fuel cell assembly, said flow field face and said flow channel comprising first and second sections, said first section being connected with said second section;

a second member coupled with said first member in order to form said fluid flow plate, said second member having a second inward face, wherein one or more pockets are formed between said First and second inward faces for decreasing density of said fluid flow plate.

2. The fluid flow plate of claim 1, wherein said first section includes one or more end sections of said flow channel, and wherein said second section includes an intermediate section of said flow channel.

3. The fluid flow plate of claim 2, further comprising an interposed member positioned between said second inward face and an interface between said intermediate section and at least one of said one or more end sections, wherein said interposed member serves to isolate said reactant fluid from said second member.

4. The fluid flow plate of claim 2, wherein said one or more end sections include an inlet, a turn, and an outlet.

5. The fluid flow plate of claim 2, further comprising a third member positioned adjacent said first inward face, said intermediate section being fastened to one or more of said third member and at least one of said one or more end sections, at least one of said one or more end sections being fastened to one or more of said third member and said intermediate section.

6. The fluid flow plate of claim 1, further comprising an interposed member positioned between said first and second inward faces, wherein said interposed member serves to isolate said reactant fluid from said second member.

7. The fluid flow plate of claim 1, wherein said first inward face includes an indentation thereon for forming a portion of said one or more pockets, said flow field face including a protuberance thereon for forming a portion of said flow channel, wherein said indentation forms said protuberance.

8. The fluid flow plate of claim 7, wherein said first inward face includes a first land adjacent said indentation, wherein said second inward face includes a second indentation thereon for forming a portion of said one or more pockets, said second inward face including a second land adjacent said second indentation, wherein said first and second lands are coupled.

9. The fluid flow plate of claim 8, further comprising conductive material interposed between said first and second lands.

10. A fluid flow plate for a fuel cell assembly, said fluid flow plate comprising:
   a member having an inward face with an indentation thereon for forming a pocket between first and second outward faces of said fluid flow plate; and
   said member including said first outward face with a protuberance thereon for forming a portion of a flow channel for carrying fluid for said fuel cell assembly, said first outward face and said flow channel comprising first and second sections, said first section being connected with said second section;
   wherein said indentation forms said protuberance and said pocket decreases density of said fluid flow plate.

11. The fluid flow plate of claim 10, wherein said fluid is reactant fluid for a fuel cell of said fuel cell assembly.

12. The fluid flow plate of claim 10, wherein said member is adapted for coupling with a second member having an inward face, wherein said pocket is formed between said inward faces.

13. A fluid flow plate for a fuel cell assembly, said fluid flow plate comprising:
   first and second outward faces that each have respective flow channels thereon for carrying respective fluids, at least one of said fluids serving as reactant fluid for a fuel cell of said fuel cell assembly;
   said first outward face and flow channel thereof comprising first and second sectons, said firs section being connected with said second section; and
   a pocket formed between said first and second outward faces for decreasing density of said fluid flow plate.

14. The fluid flow plate of claim 13, wherein at least one of said first and second outward faces is disposed substantially in a direction, a portion of said pocket extending between said first and second outward faces substantially in said direction.

15. The fluid flow plate of claim 14, wherein a portion of said pocket extends substantially in parallel with a portion of said at least one of said first and second outward faces.

16. The fluid flow plate of claim 13, wherein said fuel cell is a PEM fuel cell.

17. The fluid flow plate of claim 13, further comprising a member having an inward face with an indentation thereon for forming a portion of said pocket, said member including said second outward face with a protuberance thereon for forming a portion of said flow channel of said second outward face, wherein said indentation forms said protuberance.

18. The fluid flow plate of claim 13, further comprising a first member having said first outward face and a first inward face, said first member comprising said first and second sections, said first member being adapted for coupling with a second member in order to form said fluid flow plate, said second member having a second inward face, wherein said pocket is formed between said first and second inward faces.

19. The fluid flow plate of claim 18, further comprising said second member, wherein said second member includes said second outward face.

20. A method of forming a fluid flow plate for a fuel cell assembly, said method comprising:
   forming an indentation on an inward face of a member in order to form a pocket between first and second outward faces of said fluid flow plate, wherein said pocket decreases density of said fluid flow plate;
   forming a protuberance on said first outward face in order to form a portion of a flow channel for carrying fluid for said fuel cell assembly; and
   employing first and second sections to form said first outward face and said flow channel, said first section being connected with said second section;
   wherein said forming of said indentation contributes to said forming of said protuberance.

* * * * *

UNITED STATES PATENT AND TRADEMARK OFFICE
CERTIFICATE OF CORRECTION

PATENT NO. : 5,981,098
DATED : November 09, 1999
INVENTOR(S) : Nicholas G. Vitale It is certified that error appears in the above-identified patent and that said Letters Patent is hereby corrected as shown below:

Claim 1, Col. 10, line 53, delete "First" and replace with --first--.

Claim 13, Col. 12, line 4, delete "sectons, said firs" and replace with --sections, said first--.

Signed and Sealed this

Twenty-fourth Day of October, 2000

*Attest:*

Q. TODD DICKINSON

*Attesting Officer*  *Director of Patents and Trademarks*